US012514167B2

(12) United States Patent
Lu et al.

(10) Patent No.: US 12,514,167 B2
(45) Date of Patent: Jan. 6, 2026

(54) AUTOMATIC DIMMING PLANT GROWTH LIGHTING SYSTEM HAVING ENVIRONMENT DETECTING FUNCTION

(71) Applicant: Shinegrow (Xiamen) Lighting Technology Co., LTD., Fujian (CN)

(72) Inventors: Fuxing Lu, Fujian (CN); Guiqin Lin, Fujian (CN); Yu Xiao, Fujian (CN)

(73) Assignee: Shinegrow (Xiamen) Lighting Technology Co., LTD., Xiamen (CN)

( * ) Notice: Subject to any disclaimer, the term of this patent is extended or adjusted under 35 U.S.C. 154(b) by 66 days.

(21) Appl. No.: 18/216,577

(22) Filed: Jun. 29, 2023

(65) Prior Publication Data

US 2024/0306558 A1    Sep. 19, 2024

(30) Foreign Application Priority Data

Mar. 13, 2023    (CN) .......................... 202310237986.3

(51) Int. Cl.
*A01G 7/04*    (2006.01)
*G08B 21/18*    (2006.01)
(Continued)

(52) U.S. Cl.
CPC ........... *A01G 7/045* (2013.01); *G08B 21/182* (2013.01); *H05B 45/12* (2020.01); *H05B 45/22* (2020.01); *H05B 47/11* (2020.01)

(58) Field of Classification Search
CPC ...... A01G 7/045; G08B 21/182; G08B 21/24; H05B 45/12; H05B 45/22; H05B 47/11; H05B 45/20; H05B 47/105; Y02P 60/14
See application file for complete search history.

(56) References Cited

U.S. PATENT DOCUMENTS 10,117,315 B2 * 10/2018 Recker .................... H05B 45/20
10,816,939 B1 * 10/2020 Coleman ................. G01S 17/86
(Continued)

FOREIGN PATENT DOCUMENTS

| CN | 103957626 | 7/2014 |
| CN | 104582151 | 4/2015 |
| CN | 105746202 | 7/2016 |

OTHER PUBLICATIONS

Zuomin Xu et al., "Handbook of Television Program Production", Mar. 1990, cover page + pp. 297-300, China Radio Film & TV Press, China, Mar. 1990.

*Primary Examiner* — Quan Zhen Wang
*Assistant Examiner* — Rajsheed O Black-Childress
(74) *Attorney, Agent, or Firm* — Bruce Stone LLP; Joseph A. Bruce (57) ABSTRACT

An automatic dimming plant growth lighting system having environment detecting function includes a processing module, a plurality of lighting modules, a dimming module and an environmental information collecting module. The processing module receives a plant growth information, and generates a target illumination range and a target chroma range according to the plant growth information. The dimming module is connected to the processing module and the lighting modules. The environmental information collecting module detects an environmental information including a current chroma and a current illumination. The processing module controls the dimming module to adjust the lighting modules in order to change the current illumination and the current chroma, such that the current illumination is within the target illumination range and the current chroma is within the target chroma range.

6 Claims, 5 Drawing Sheets

(51) Int. Cl.
*H05B 45/12* (2020.01)
*H05B 45/22* (2020.01)
*H05B 47/11* (2020.01)

(56) References Cited

U.S. PATENT DOCUMENTS

| | | | |
|---|---|---|---|
| 12,041,893 B1* | 7/2024 | Genga, Jr. | F21V 21/15 |
| 2018/0132328 A1* | 5/2018 | Huang | H05B 47/105 |
| 2019/0082613 A1* | 3/2019 | Eisele | H05B 47/115 |
| 2021/0112647 A1* | 4/2021 | Coleman | H05B 47/1985 |

* cited by examiner

AUTOMATIC DIMMING PLANT GROWTH LIGHTING SYSTEM HAVING ENVIRONMENT DETECTING FUNCTION

BACKGROUND OF THE INVENTION

1. Field of the Invention

The present invention relates to an automatic dimming plant growth lighting system, in particular to an automatic dimming plant growth lighting system having environment detecting function.

2. Description of the Prior Art

Generally speaking, the light composition of the plant growth lighting devices of a currently available plant growth lighting system cannot be adjusted, so it can only meet the growth requirement of one kind of plant. Thus, the versatility of the currently available plant growth lighting system needs to be further improved.

In addition, the currently available plant growth lighting system cannot adjust the brightness of the plant growth lighting devices according to the light intensity of the ambient light. Therefore, when the light intensity of the ambient light is sufficient, the plant growth lighting devices of the plant growth lighting system still need to operate at maximal brightness, which increases the energy consumption of the plant growth lighting system.

Moreover, the currently available plant growth lighting system cannot detect the environmental temperature and the environmental carbon dioxide concentration. Therefore, if the environmental temperature and/or environmental carbon dioxide concentration prevent plants from efficiently photosynthesizing, the plant growth lighting system cannot properly adjust the brightness of the plant growth lighting devices thereof, which further increases the energy consumption of the plant growth lighting system.

SUMMARY OF THE INVENTION

One embodiment of the present invention provides an automatic dimming plant growth lighting system having environment detecting function, which includes a processing module, a plurality of lighting modules, a dimming module and an environmental information collecting module. The processing module receives a plant growth information, and generates a target illumination range and a target chroma range according to the plant growth information. The dimming module is connected to the processing module and the lighting modules. The environmental information collecting module detects an environmental information including a current chroma and a current illumination. The processing module controls the dimming module to adjust the lighting modules in order to change the current illumination and the current such that the current illumination is within the target illumination range and the current chroma is within the target chroma range.

In one embodiment of the present invention, the processing module further generates a target temperature range and a target carbon dioxide concentration range. The environmental information further includes a current temperature and a current carbon dioxide concentration range.

In one embodiment of the present invention, the automatic dimming plant growth lighting system further includes an alarm module. When the processing module determines that the current temperature is not within the target temperature range, the processing module controls the dimming module to turn off the lighting modules or reduce the brightness of the lighting modules. Then, the processing module controls the alarm module to generate a temperature alarm signal.

In one embodiment of the present invention, the automatic dimming plant growth lighting system further includes an alarm module. When the processing module determines that the current carbon dioxide concentration is not within the target carbon dioxide concentration range, the processing module controls the dimming module to turn off the lighting modules or reduce the brightness of the lighting modules. Then, the processing module controls the alarm module to generate a carbon dioxide concentration alarm signal.

In one embodiment of the present invention, the automatic dimming plant growth lighting system further includes a height adjusting module connected to the environmental information collecting module.

In one embodiment of the present invention, the environmental information collecting module detects the red light content, the green light content, the blue light content, the infrared light content and the light intensity of an ambient light. The environmental information collecting module analyzes the red light content, the green light content, the blue light content and the infrared light content to generate the current chroma, and analyzes the light intensity to generate the current illumination.

In one embodiment of the present invention, the environmental information collecting module includes a plurality of light collecting units for detecting the red light content, the green light content, the blue light content, the infrared light content and the light intensity of the ambient light.

In one embodiment of the present invention, the light collecting units are photodiodes.

In one embodiment of the present invention, the automatic dimming plant growth lighting system further includes a dip switch connected to the processing module. The processing module divides the lighting modules into a plurality of groups according to the grouping result of the dip switch in order to control the illuminations and chromas of the groups respectively.

In one embodiment of the present invention, the lighting modules are light-emitting diode (LED) modules.

The automatic dimming plant growth lighting system having environment detecting function in accordance with the embodiments of the present invention may have the following advantages:

(1) In one embodiment of the present invention, the automatic dimming plant growth lighting system has an environmental information collecting module, a processing module, a plurality of lighting modules and a dimming module, which can detect the current chroma and the current illumination. Thus, the processing module can control the dimming module to adjust the lighting modules according to a target illumination range and a target chroma range in order to change the current illumination and the current chroma. Thus, the current illumination can be within the target illumination range and the current chroma can be within the target chroma range. Accordingly, the automatic dimming plant growth lighting system can adaptively increase or decrease the brightness of the lighting modules according to the ambient light, and the lights emitted by the lighting modules can have proper chroma so as to meet the growth requirements of different plants and effectively reduce the power consumption of the system.

(2) In one embodiment of the present invention, the environmental information collecting module of the automatic dimming plant growth lighting system has a plurality of light collecting units and the calculating circuit. Therefore, the environmental information collecting module can precisely detect and analyze the red light content, green light content, blue light content, infrared light content and light intensity of the ambient light in order to generate the current illumination and the current chroma. The above circuit structure can effectively improve the detecting precision and analysis accuracy, such that the automatic dimming plant growth lighting system can achieve greater performance.

(3) In one embodiment of the present invention, the environmental information collecting module of the automatic dimming plant growth lighting system can detect the red light content, green light content, blue light content, infrared light content and light intensity of the ambient light without a camera. Accordingly, the cost of the automatic dimming plant growth lighting system can be further reduced.

(4) In one embodiment of the present invention, the environmental information collecting module of the automatic dimming plant growth lighting system can detect the current temperature and the current carbon dioxide concentration. The processing module can compare the current temperature and the current carbon dioxide concentration with the target temperature range and the current carbon dioxide concentration range respectively. Then, the processing module can control the dimming module to turn off the lighting modules or reduce the brightness of the lighting modules, which can further reduce the power consumption of the system. As a result, the automatic dimming plant growth lighting system can be more environmental-friendly.

(5) In one embodiment of the present invention, the automatic dimming plant growth lighting system further has a dip switch. The user can divide the lighting modules of the automatic dimming plant growth lighting system into several groups via the dip switch. Then, the processing module can control the illuminations and chromas of the groups according to the grouping result of the dip switch, such that the chromas and the illuminations of the groups can satisfy the requirements of different plants or different growth periods.

(6) In one embodiment of the present invention, the automatic dimming plant growth lighting system further has an alarm module. When the processing module determines that the current temperature is not within the target temperature range or the current carbon dioxide concentration is not within the target carbon dioxide concentration range, the processing module controls the alarm module to generate a temperature alarm signal or a carbon dioxide concentration alarm signal in order to remind the user to take necessary measures to adjust the environmental temperature or environmental carbon dioxide concentration. Accordingly, the automatic dimming plant growth lighting system can effectively enhance the efficiency of the photosynthesis of the plant.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
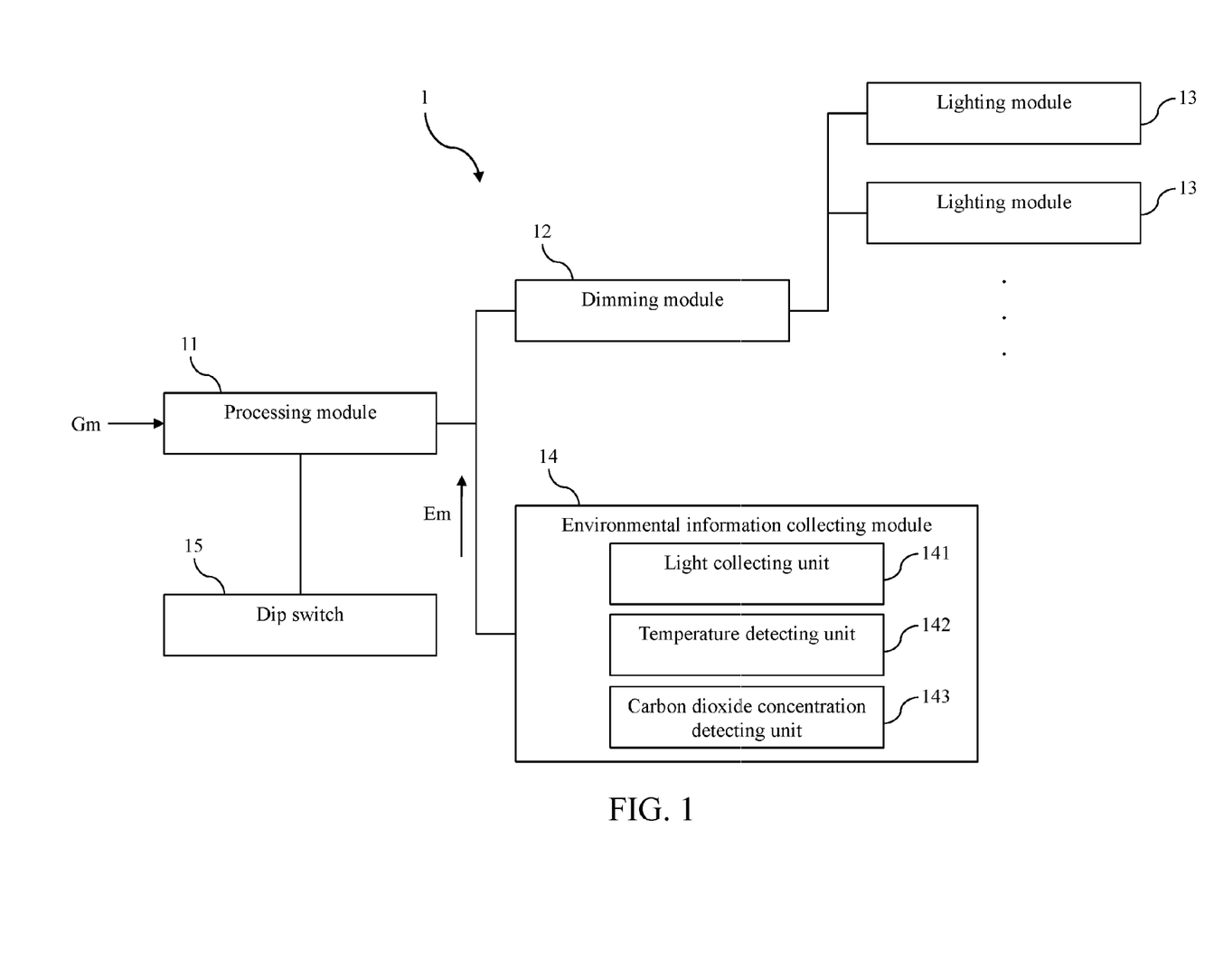
FIG. 1 is a block diagram of an automatic dimming plant growth lighting system having environment detecting function in accordance with one embodiment of the present invention.
Figure 2:
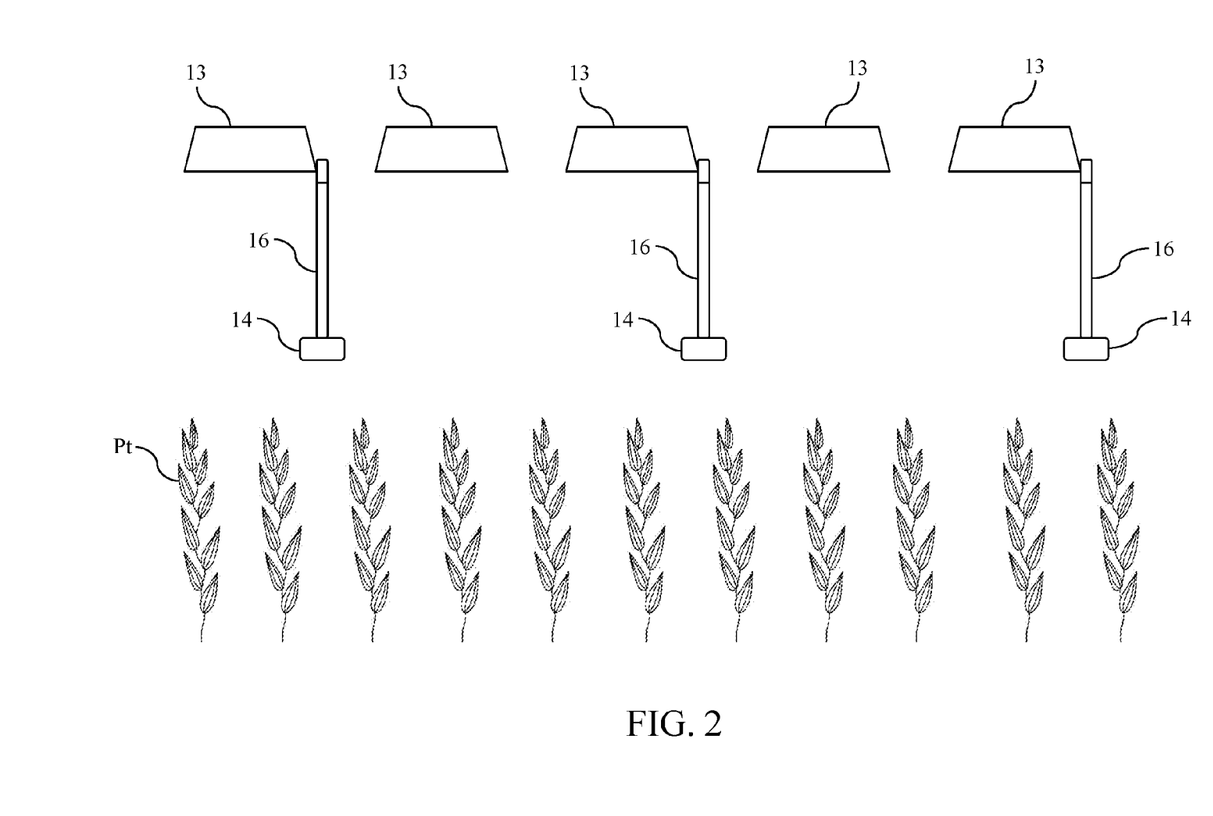
FIG. 2 is a first schematic view of the automatic dimming plant growth lighting system having environment detecting function in accordance with one embodiment of the present invention.

Please refer to FIG. 1 and FIG. 2. FIG. 1 is a block diagram of an automatic dimming plant growth lighting system having environment detecting function in accordance with one embodiment of the present invention. FIG. 2 is a first schematic view of the automatic dimming plant growth lighting system having environment detecting function in accordance with one embodiment of the present invention. As shown in FIG. 1, the automatic dimming plant growth lighting system 1 includes a processing module 11, a dimming module 12, a plurality of lighting modules 13, an environmental information collecting module 14 and a dip switch 15. The automatic dimming plant growth lighting system 1 can be installed in a greenhouse (or other similar buildings) in order to grow a target plant Pt.

The processing module 11 can receive the plant growth information Gm of the target plant Pt in order to generate a target illumination range, a target chroma range, a target temperature range and a target carbon dioxide concentration range according to the plant growth information Gm. The user can execute the application of the automatic dimming plant growth lighting system 1 via a mobile device (e.g., a smart phone, a tablet computer, a laptop computer, etc.) to download the plant growth information of various kinds of plants from an external database or Internet so as to select the plant growth information Gm corresponding to the target plant Pt. then, the user can transmit the plant growth information Gm to the processing module 11. In one embodiment, the processing module 11 may be a microcontroller unit (MCU), a central-processing unit (CPU), an application specific integrated circuit (ASIC), a field programmable gate array (FPGA) or other similar devices.

The dimming module 12 is connected to the processing module 11 and the lighting modules 13. In one embodiment, the dimming module 12 may be a pulse-width modulation (PWM) dimming circuit, variable resistor dimming circuit or other similar circuits. In one embodiment, the above lighting modules 13 may be a light-emitting diode (LED) lighting module, a fluorescent lamp or other similar devices.

The environmental information collecting module 14 includes a plurality of light collecting units 141. The environmental information collecting module 14 can detect the environmental information Em, which may include a current chroma and a current illumination. The above light collecting units 141 may be photodiodes or other components having similar function.

The processing module 11 can control the dimming module 12 to adjust the lighting modules 13 according to the target illumination range and the target chroma range to change the current illumination and the current chroma, such that the current illumination can be within the target illumination range and the current chroma can be within the target chroma range. In this way, the automatic dimming plant growth lighting system 1 can adaptively increase or decrease the brightness of the lighting modules 13 and the lighting modules 13 can have proper chroma so as to meet the growth requirements of the target plant Pt. Accordingly, the power consumption of the automatic dimming plant growth lighting system 1 can be effectively reduced and promote the growth of the target plant Pt.

In addition, the environmental information collecting module 14 further includes a temperature detecting unit 142 and a carbon dioxide concentration detecting unit 143. The temperature detecting unit 142 can detect the current temperature and the carbon dioxide concentration detecting unit 143 can detect the current carbon dioxide concentration. In one embodiment, the temperature detecting unit 142 may be a thermometer or other circuits having temperature detecting function. In one embodiment, the carbon dioxide concentration unit 143 may be a carbon dioxide concentration detector, a carbon dioxide concentration meter or other similar devices.

When the processing module 11 determines that the current temperature is not within the target temperature range, the processing unit 11 controls the dimming module 12 to turn off the lighting modules 13 or reduce the brightness of the lighting modules 13. Similarly, when the processing module 11 determines that the current carbon dioxide concentration is not within the target carbon dioxide concentration range, the processing module 11 controls the dimming module 12 to turn off the lighting modules 13 or reduce the brightness of the lighting modules 13. As set forth above, when the target plant Pt cannot effectively do photosynthesis due to environmental factors (e.g., temperature, carbon dioxide concentration, etc.), the processing module 11 can properly turn off the lighting modules 13 or decrease the brightness of the lighting modules 13. Thus, the power consumption of the automatic dimming plant growth lighting system 1 can be reduced in order to meet the requirements of environmental protection.

The dip switch 15 is connected to the processing module 11. The user can divide the lighting modules 13 into a plurality of groups via the dip switch 15. Then, the processing module 11 can control the illumination and chroma of these groups according to the grouping result of the dip switch 15.

As described above, the automatic dimming plant growth lighting system 1 has the environmental information collecting module 14, the processing module 11 and the dimming module 12, which can detect the current chroma and the current illumination. Therefore, the processing module 11 can control the dimming module 12 to adjust the lighting modules 13 according to the target illumination range and the target chroma range to change the current illumination and the current chroma, such that the current illumination can be within the target illumination range and the current chroma can be within the target chroma range. As a result, the automatic dimming plant growth lighting system 1 can effectively and adaptively increase or decrease the brightness of the lighting modules 13 according to the ambient light and the lighting modules 13 can have proper chroma in order to meet the growth requirements of different plants and further decrease the power consumption of the automatic dimming plant growth lighting system 1.

Further, the processing module 11 can further compare the current temperature and the current carbon dioxide concentration with the target temperature range and the target carbon dioxide concentration range respectively in order to obtain a comparison result. Afterward, the processing module 11 can control the dimming module 12 to turn off the lighting modules 13 or reduce the brightness of the lighting modules 13 according to the comparison result. Therefore, the power consumption of the automatic dimming plant growth lighting system 1 can be further reduced, so the automatic dimming plant more growth lighting system 1 can be environmental-friendly.

The embodiment just exemplifies the present invention and is not intended to limit the scope of the present invention; any equivalent modification and variation according to the spirit of the present invention is to be also included within the scope of the following claims and their equivalents.

As shown in FIG. 2, the automatic dimming plant growth lighting system 1 can include a plurality of height adjusting modules 16. The environmental information collecting module 14 is connected to the height adjusting modules 16. Each of the height adjusting modules 16 is disposed on the ceiling or any one of the lighting modules 13. The user can manually operate the height adjusting modules 16 so as to change the height of the environmental information collecting module 14. In this way, the height of the environmental information collecting module 14 can be changed with the height of the target plant Pt, so the environmental information collecting module 14 will not be covered by the leaves of the target plant Pt. In one embodiment, the height adjusting module 16 may be an adjustable transmission device, a telescopic rod or other similar components. In another embodiment, the height adjusting module 16 may have the automatic adjusting function.

The embodiment just exemplifies the present invention and is not intended to limit the scope of the present invention; any equivalent modification and variation according to the spirit of the present invention is to be also included within the scope of the following claims and their equivalents.

Figure 3:
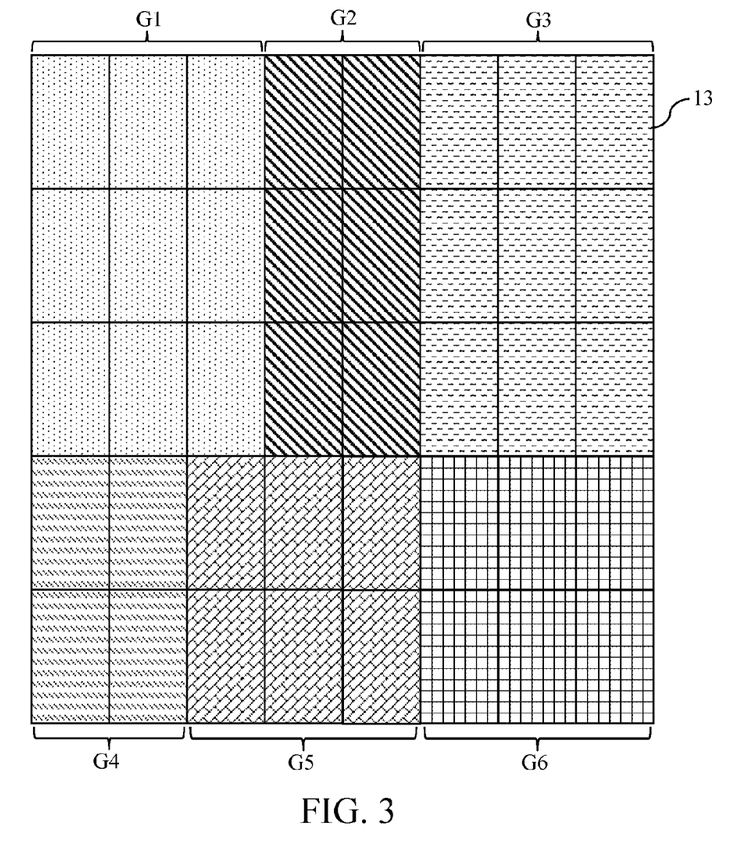
FIG. 3 is a second schematic view of the automatic dimming plant growth lighting system having environment detecting function in accordance with one embodiment of the present invention.

Please refer to FIG. 3, which is a second schematic view of the automatic dimming plant growth lighting system having environment detecting function in accordance with one embodiment of the present invention. As shown in FIG. 3, the user can divide the lighting modules 13 into six groups G1~G6 via the dip switch 15 and the processing module 11 can control the illuminations and the chromas of the groups G1~G6 according to the grouping result of the dip switch 15. In this way, the illuminations and the chromas of the groups G1~G6 can satisfy the requirements of different plants or different growth periods (seeding period, growing period, flowering period, etc.).

The embodiment just exemplifies the present invention and is not intended to limit the scope of the present invention; any equivalent modification and variation according to the spirit of the present invention is to be also included within the scope of the following claims and their equivalents.

Figure 4:
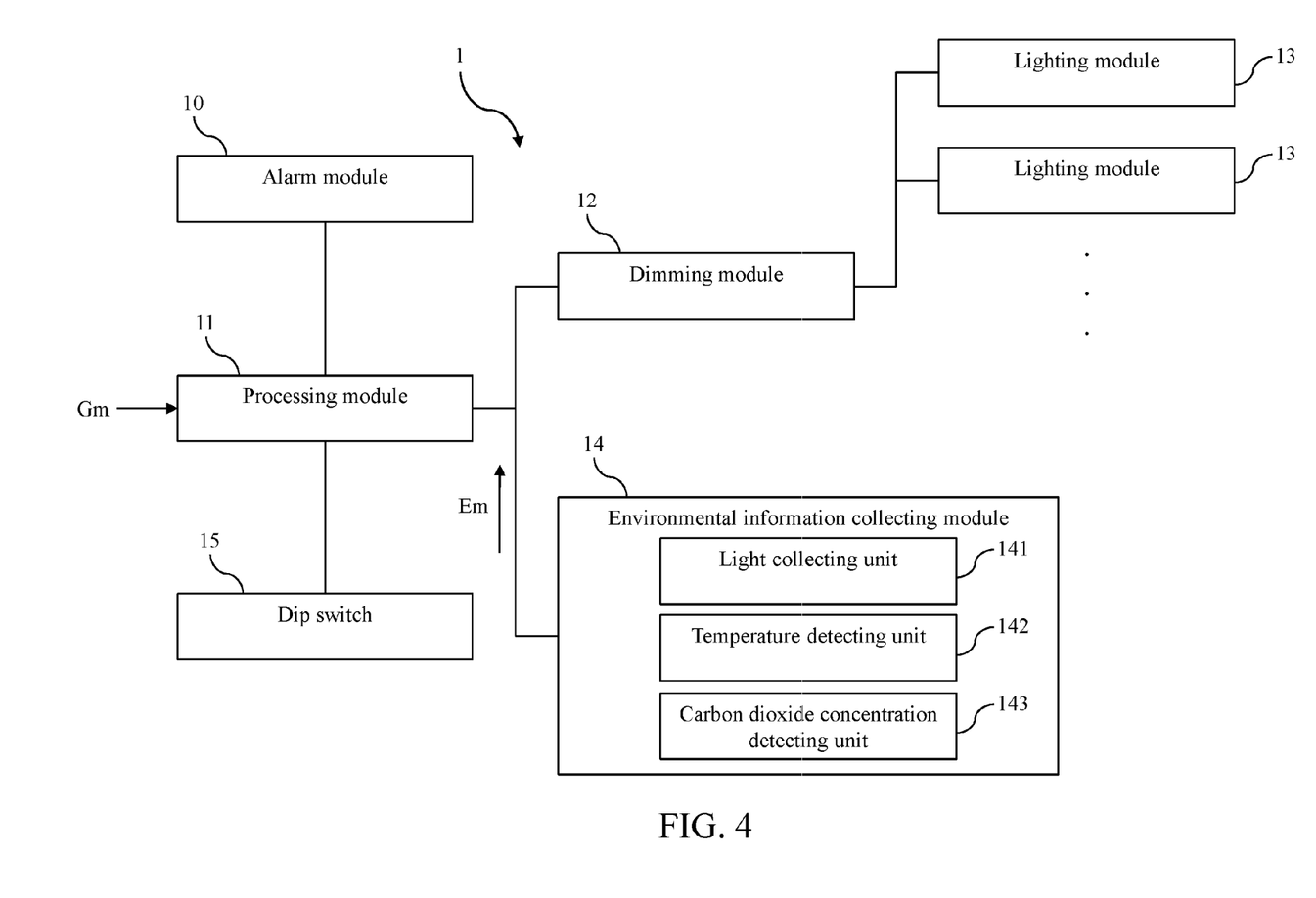
FIG. 4 is a block diagram of an automatic dimming plant growth lighting system having environment detecting function in accordance with another embodiment of the present invention.

Please refer to FIG. 4, which is a block diagram of an automatic dimming plant growth lighting system having environment detecting function in accordance with another embodiment of the present invention. As shown in FIG. 4, the automatic dimming plant growth lighting system 1 includes a processing module 11, a dimming module 12, a plurality of lighting modules 13, an environmental information collecting module 14 and a dip switch 15.

The above elements are similar to those of the previous embodiment, so will not be described herein again. The difference between this embodiment and the previous embodiment is that the automatic dimming plant growth lighting system 1 of this embodiment further includes an alarm module 10. When the processing module 11 determines that the current temperature is not within the target temperature range, the processing module 11 can control the dimming module 12 to turn off the lighting modules 13 or reduce the brightness of the lighting modules 13. In the meanwhile, the processing module 11 can control the alarm module 10 to generate a temperature alarm signal and transmit the temperature alarm signal to the mobile device of the user.

Similarly, When the processing module 11 determines that the current carbon dioxide concentration is not within the target carbon dioxide concentration range, the processing module 11 can control the dimming module 12 to turn off the lighting modules 13 or reduce the brightness of the lighting modules 13. In the meanwhile, the processing module 11 can control the alarm module 10 to generate a carbon dioxide concentration alarm signal and transmit the carbon dioxide concentration alarm signal to the mobile device of the user. In this way, the user can take necessary measure on time so as to adjust the temperature or the carbon dioxide concentration.

The embodiment just exemplifies the present invention and is not intended to limit the scope of the present invention; any equivalent modification and variation according to the spirit of the present invention is to be also included within the scope of the following claims and their equivalents.

It is worthy to point out that the light composition of the plant growth lighting devices of the currently available plant growth lighting system cannot be adjusted, so it can only meet the growth requirement of one kind of plant. Thus, the versatility of the currently available plant growth lighting system needs to be further improved. In addition, the currently available plant growth lighting system cannot adjust the brightness of the plant growth lighting devices according to the light intensity of the ambient light. Therefore, when the light intensity of the ambient light is sufficient, the plant growth lighting devices of the plant growth lighting system still need to operate at maximal brightness, which increases the energy consumption of the plant growth lighting system. On the contrary, according to one embodiment of the present invention, the automatic dimming plant growth lighting system has an environmental information collecting module, a processing module, a plurality of lighting modules and a dimming module, which can detect the current chroma and the current illumination. Thus, the processing module can control the dimming module to adjust the lighting modules according to a target illumination range and a target chroma range in order to change the current illumination and the current chroma. Thus, the current illumination can be within the target illumination range and the current chroma can be within the target chroma range. Accordingly, the automatic dimming plant growth lighting system can adaptively increase or decrease the brightness of the lighting modules according to the ambient light, and the lights emitted by the lighting modules can have proper chroma so as to meet the growth requirements of different plants and effectively reduce the power consumption of the system.

Also, according to one embodiment of the present invention, the environmental information collecting module of the automatic dimming plant growth lighting system has a plurality of light collecting units and the calculating circuit. Therefore, the environmental information collecting module can precisely detect and analyze the red light content, green light content, blue light content, infrared light content and light intensity of the ambient light in order to generate the current illumination and the current chroma. The above circuit structure can effectively improve the detecting precision and analysis accuracy, such that the automatic dimming plant growth lighting system can achieve greater performance.

Further, according to one embodiment of the present invention, the environmental information collecting module of the automatic dimming plant growth lighting system can detect the red light content, green light content, blue light content, infrared light content and light intensity of the ambient light without a camera. Accordingly, the cost of the automatic dimming plant growth lighting system can be further reduced.

Moreover, according to one embodiment of the present invention, the environmental information collecting module of the automatic dimming plant growth lighting system can detect the current temperature and the current carbon dioxide concentration. The processing module can compare the current temperature and the current carbon dioxide concentration with the target temperature range and the current carbon dioxide concentration range respectively. Then, the processing module can control the dimming module to turn off the lighting modules or reduce the brightness of the lighting modules, which can further reduce the power consumption of the system. As a result, the automatic dimming plant growth lighting system can be more environmental-friendly.

Furthermore, according to one embodiment of the present invention, the automatic dimming plant growth lighting system further has a dip switch. The user can divide the lighting modules of the automatic dimming plant growth lighting system into several groups via the dip switch. Then, the processing module can control the illuminations and chromas of the groups according to the grouping result of the dip switch, such that the chromas and the illuminations of the groups can satisfy the requirements of different plants or different growth periods. Accordingly, the automatic dimming plant growth lighting system according to the embodiments of the present invention can definitely achieve great technical effects.

Figure 5:
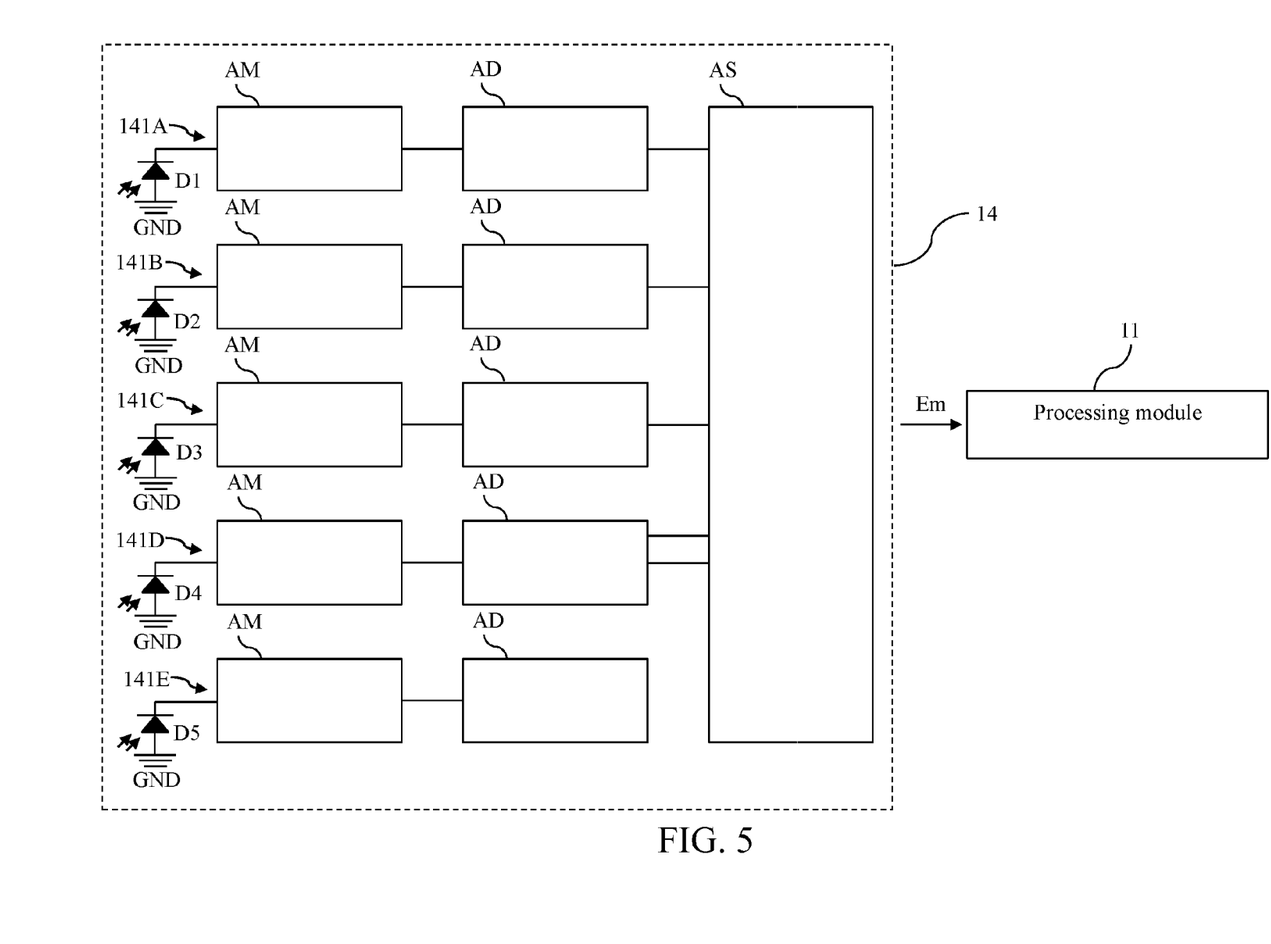
FIG. 5 is a block diagram of an environmental information collecting module of an automatic dimming plant growth lighting system having environment detecting function in accordance with still another embodiment of the present invention.

Please refer to FIG. 5, which is a block diagram of an environmental information collecting module of an automatic dimming plant growth lighting system having environment detecting function in accordance with still another embodiment of the present invention. As shown in FIG. 5, the environmental information collecting module 14 includes a plurality of light collecting units 141A~141E and a calculating circuit AS. The light collecting units 141A includes a photodiode D1, a gain amplifier AM and an analog-to-digital converter AD, which can detect the red light content of the ambient light. The light collecting unit 141B includes a photodiode D2, a gain amplifier AM and an analog-to-digital converter AD, which can detect the green light content of the ambient light. The light collecting unit 141C includes a photodiode D3, a gain amplifier AM and an analog-to-digital converter AD, which can detect the green light content of the ambient light. The light collecting unit 141D includes a photodiode D4, a gain amplifier AM and an analog-to-digital converter AD, which can detect the infrared light content of the ambient light. The light collecting unit 141E includes a photodiode D5, a gain amplifier AM and an analog-to-digital converter AD, which can detect the light intensity (white light) of the ambient light.

The photodiode D1 of the light connecting unit 141A detects the red light signal of the ambient light, which is processed by the gain amplifier AM and the analog-to-digital converter AD to generate a red light digital signal. The light collecting units 131B~141E have the same operational mechanism. The calculating circuit AS receives and analyzes the red light digital signal, the green light digital signal, the blue light digital signal and the infrared light digital signal in order to obtain the current chroma. Afterward, the calculating circuit AS deducts the infrared light signal from the red light signal to obtain the red light content. Then, the calculating circuit AS deducts the infrared light signal from the green light signal to obtain the green light content. Next, the calculating circuit AS deducts the infrared light signal from the blue light signal to obtain the blue light content. Thus, the calculating circuit AS can calculate the current chroma according to the according to the red light content, the green light content and the blue light content. Similarly, the photodiode D5 of the light connecting unit 141E can detect the light intensity of the ambient light, which is processed by the gain amplifier AM and the analog-to-digital converter AD to generate a light intensity digital signal so as to calculate the current illumination accordingly. Finally, the calculating circuit AS can transmit the environmental information Em including the current illumination and the current chroma to the processing module 11. In this embodiment, the calculating circuit AS may be a microcontroller unit (MCU), a central-processing unit (CPU), an application specific integrated circuit (ASIC), a field programmable gate array (FPGA) or other similar devices.

As previously stated, the environmental information collecting module 14 of the automatic dimming plant growth lighting system 1 has the light collecting units 141A~141E and the calculating circuit AS. Therefore, the environmental information collecting module 14 can precisely detect and analyze the red light content, green light content, blue light content, infrared light content and light intensity of the ambient light in order to generate the current illumination and the current chroma. The above circuit structure can effectively improve the detecting precision and analysis accuracy, such that the automatic dimming plant growth lighting system 1 can achieve greater performance.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the automatic dimming plant growth lighting system has an environmental information collecting module, a processing module, a plurality of lighting modules and a dimming module, which can detect the current chroma and the current illumination. Thus, the processing module can control the dimming module to adjust the lighting modules according to a target illumination range and a target chroma range in order to change the current illumination and the current chroma. Thus, the current illumination can be within the target illumination range and the current chroma can be within the target chroma range. Accordingly, the automatic dimming plant growth lighting system can adaptively increase or decrease the brightness of the lighting modules according to the ambient light, and the lights emitted by the lighting modules can have proper chroma so as to meet the growth requirements of different plants and effectively reduce the power consumption of the system.

According to one embodiment of the present invention, the environmental information collecting module of the automatic dimming plant growth lighting system has a plurality of light collecting units and the calculating circuit. Therefore, the environmental information collecting module can precisely detect and analyze the red light content, green light content, blue light content, infrared light content and light intensity of the ambient light in order to generate the current illumination and the current chroma. The above circuit structure can effectively improve the detecting precision and analysis accuracy, such that the automatic dimming plant growth lighting system can achieve greater performance.

Also, according to one embodiment of the present invention, the environmental information collecting module of the automatic dimming plant growth lighting system can detect the red light content, green light content, blue light content, infrared light content and light intensity of the ambient light without a camera. Accordingly, the cost of the automatic dimming plant growth lighting system can be further reduced.

Further, according to one embodiment of the present invention, the environmental information collecting module of the automatic dimming plant growth lighting system can detect the current temperature and the current carbon dioxide concentration. The processing module can compare the current temperature and the current carbon dioxide concentration with the target temperature range and the current carbon dioxide concentration range respectively. Then, the processing module can control the dimming module to turn off the lighting modules or reduce the brightness of the lighting modules, which can further reduce the power consumption of the system. As a result, the automatic dimming plant growth lighting system can be more environmental-friendly.

Moreover, according to one embodiment of the present invention, the automatic dimming plant growth lighting system further has a dip switch. The user can divide the lighting modules of the automatic dimming plant growth lighting system into several groups via the dip switch. Then, the processing module can control the illuminations and chromas of the groups according to the grouping result of the dip switch, such that the chromas and the illuminations of the groups can satisfy the requirements of different plants or different growth periods.

Furthermore, according to one embodiment of the present invention, the automatic dimming plant growth lighting system further has an alarm module. When the processing module determines that the current temperature is not within the target temperature range or the current carbon dioxide concentration is not within the target carbon dioxide concentration range, the processing module controls the alarm module to generate a temperature alarm signal or a carbon dioxide concentration alarm signal in order to remind the user to take necessary measures to adjust the environmental temperature or environmental carbon dioxide concentration. Accordingly, the automatic dimming plant growth lighting system can effectively enhance the efficiency of the photosynthesis of the plant.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic dimming plant growth lighting system having environment detecting function, comprising:
   a processing module configured to receive a plant growth information, and generating a target illumination range and a target chroma range according to the plant growth information;
   a dip switch connected to the processing module;
   a plurality of lighting modules, wherein the processing module divides the lighting modules into a plurality of groups according to a grouping result of the dip switch in order to control illuminations and chromas of the groups respectively;
   a dimming module connected to the processing module and the lighting modules; and
   an environmental information collecting module configured to detect an environmental information comprising a current chroma and a current illumination, wherein the environmental information collecting module comprises a plurality of light collecting units and a calculating circuit, wherein each of the light collecting units comprises a photodiode, a gain amplifier and an analog-to-digital converter, the photodiodes of the light collecting units are configured to detect a red light signal, a green light signal, a blue light signal, an infrared light signal and a light intensity of an ambient light, wherein the red light signal, the green light signal, the blue light signal, the infrared light signal and the light intensity are processed by the gain amplifiers and the analog-to-digital converters of the light collecting units to generate a red light digital signal, a green light digital signal, a blue light digital signal, an infrared light digital signal and a light intensity digital signal, wherein the calculating circuit is configured to deduct the infrared light signal from the red light signal to obtain a red light content, the calculating circuit is configured to deduct the infrared light signal from the green light signal to obtain a green light content, the calculating circuit is configured to deduct the infrared light signal from the blue light signal to obtain a blue light content, and the calculating circuit is configured to calculate a current chroma according to the red light content, the green light content and the blue light content, wherein the calculating circuit is configured to calculate a current illumination according to the light intensity digital signal;
   wherein the processing module controls the dimming module to adjust the lighting modules in order to change the current illumination and the current chroma, whereby the current illumination is within the target illumination range and the current chroma is within the target chroma range.

2. The automatic dimming plant growth lighting system having environment detecting function as claimed in claim 1, wherein the processing module is configured to further generate a target temperature range and a target carbon dioxide concentration range, and the environmental information further comprises a current temperature and a current carbon dioxide concentration range.

3. The automatic dimming plant growth lighting system having environment detecting function as claimed in claim 2, further comprising an alarm module, wherein when the processing module determines that the current temperature is not within the target temperature range, the processing module controls the dimming module to turn off the lighting modules or reduce a brightness of the lighting modules, and control the alarm module to generate a temperature alarm signal.

4. The automatic dimming plant growth lighting system having environment detecting function as claimed in claim 2, further comprising an alarm module, wherein when the processing module determines that the current carbon dioxide concentration is not within the target carbon dioxide concentration range, the processing module controls the dimming module to turn off the lighting modules or reduce a brightness of the lighting modules, and control the alarm module to generate a carbon dioxide concentration alarm signal.

5. The automatic dimming plant growth lighting system having environmental detecting function as claimed in claim 1, further comprising a height adjusting module connected to the environmental information collecting module.

6. The automatic dimming plant growth lighting system having environment detecting function as claimed in claim 1, wherein the lighting modules are light-emitting diode modules.

* * * * *